(12) United States Patent
McManus

(10) Patent No.: US 6,690,013 B2
(45) Date of Patent: Feb. 10, 2004

(54) APPARATUS AND METHOD FOR COMPENSATING FOR PIXEL NON-UNIFORMITY IN A BOLOMETER

(75) Inventor: Timothy J. McManus, Minneapolis, MN (US)

(73) Assignee: Infrared Solutions, Inc., Plymouth, MN (US)

( * ) Notice: Subject to any disclaimer, the term of this patent is extended or adjusted under 35 U.S.C. 154(b) by 0 days.

(21) Appl. No.: 10/225,768

(22) Filed: Aug. 22, 2002

(65) Prior Publication Data

US 2003/0006374 A1 Jan. 9, 2003

Related U.S. Application Data

(62) Division of application No. 09/567,568, filed on May 5, 2000, now Pat. No. 6,465,785.

(51) Int. Cl.$^7$ .................................................. G01J 5/00
(52) U.S. Cl. .................... 250/338.1; 250/330; 250/332; 250/339.09
(58) Field of Search ................................ 250/330, 332, 250/338.1, 339.09, 342, 252.1

(56) References Cited

U.S. PATENT DOCUMENTS 6,465,785 B1 * 10/2002 McManus ................ 250/338.1

* cited by examiner

Primary Examiner—Georgia Epps
Assistant Examiner—M. Hasan
(74) Attorney, Agent, or Firm—Robert A. Pajak

(57) ABSTRACT

In accordance with the present invention, a microbolometer focal plane array is provided with at least one thermally-shorted microbolometer detector that is thermally shorted to the microbolometer focal plane array substrate. A characteristic relationship is empirically derived for determining a corrected resistance value for each detector of the microbolometer focal plane array in response to radiation from a target scene as a function of the corresponding detector resistance value, the thermally-shorted microbolometer detector resistance value, and the empirically derived characteristic relationship.

30 Claims, 6 Drawing Sheets

INCIDENT
INFARED RADIATION

APPARATUS AND METHOD FOR COMPENSATING FOR PIXEL NON-UNIFORMITY IN A BOLOMETER

This is a division of a prior patent application having Ser. No. 09/567,568 now U.S. Pat. No. 6,465,785 B1 filed on May 5, 2002, entitled, "APPARATUS AND METHOD FOR COMPENSATING FOR PIXEL NON-UNIFORMITY IN A BOLOMETER"

FIELD OF THE INVENTION

The present invention relates generally to bolometers, and more specifically to micro-bolometers, and particularly to an apparatus and method for providing compensation for microbolometer pixel non-uniformity in an array of such pixels.

BACKGROUND OF THE INVENTION

An infrared detector called the "bolometer," now well known in the art, operates on the principle that the electrical resistance of the bolometer material changes with respect to the bolometer temperature, which in turn changes in response to the quantity of absorbed incident infrared radiation. These characteristics can be exploited to measure incident infrared radiation on the bolometer by sensing the resulting change in its resistance. When used as an infrared detector, the bolometer is generally thermally isolated from its supporting substrate or surroundings to allow the absorbed incident infrared radiation to generate a temperature change in the bolometer material, and be less affected by substrate temperature.

Modern microbolometer structures were developed by the Honeywell Corporation. By way of background, certain prior art uncooled, (i.e., not temperature stabilized) detectors and/or arrays, for example those manufactured by Honeywell, Inc., are described in U.S. Pat. Nos. 5,286,976, and 5,300,915, and 5,021,663, each of which is hereby incorporated by reference. These detectors include those uncooled microbolometer detectors which have a two-level microbridge configuration: the upper level and lower level form a cavity that sensitizes the bolometer to radiation of a particular range of wavelengths; the upper level forms a "microbridge" which includes a thermal sensing element; the lower level includes the read-out integrated circuitry and reflective material to form the cavity; the upper microbridge is supported by legs which thermally isolate the upper level from the lower level and which communicate electrical information therein and to the integrated circuitry.

A list of references related to the aforesaid structure may be found in U.S. Pat. No. 5,420,419. The aforesaid patent describes a two-dimensional array of closely spaced microbolometer detectors which are typically fabricated on a monolithic silicon substrate or integrated circuit. Commonly, each of these microbolometer detectors are fabricated on the substrate by way of an, commonly referred to, air bridge structure which includes a temperature sensitive resistive element that is substantially thermally isolated from the substrate. This aforesaid microbolometer detector structure is herein referred to as a "thermally-isolated microbolometer." The resistive element, for example may be comprised of vanadium oxide material that absorbs infrared radiation. The constructed air bridge structure provides good thermal isolation between the resistive element of each microbolometer detector and the silicon substrate. An exemplary microbolometer structure may dimensionally be in the order of approximately 50 microns by 50 microns.

In contrast, a microbolometer detector that is fabricated directly on the substrate, without the air-bridge structure, is herein referred to as a "thermally shorted microbolometer," since the temperature of the substrate and/or package will directly affect it. Alternately, it may be regarded as a "heat sunk" pixel since it is shorted to the substrate.

Microbolometer detector arrays may be used to sense a focal plane of incident radiation (typically infrared). Each microbolometer detector of an array may absorb any radiation incident thereon, resulting in a corresponding change in its temperature, which results in a corresponding change in its resistance. With each microbolometer functioning as a pixel, a two-dimensional image or picture representation of the incident infrared radiation may be generated by translating the changes in resistance of each microbolometer into a time-multiplexed electrical signal that can be displayed on a monitor or stored in a computer. The circuitry used to perform this translation is commonly known as the Read Out Integrated Circuit (ROIC), and is commonly fabricated as an integrated circuit on a silicon substrate. The microbolometer array may then be fabricated on top of the ROIC. The combination of the ROIC and microbolometer array is commonly known as a microbolometer infrared Focal Plane Array (FPA). Microbolometer focal plane arrays that contain as many as 640×480 detectors have been demonstrated.

Individual microbolometers will have non-uniform responses to uniform incident infrared radiation, even when the bolometers are manufactured as part of a microbolometer FPA. This is due to small variations in the detectors' electrical and thermal properties as a result of the manufacturing process. These non-uniformities in the microbolometer response characteristics must be corrected to produce an electrical signal with adequate signal-to-noise ratio for image processing and display.

Under the conditions where a uniform electric signal bias source and incident infrared radiation are applied to an array of microbolometer detectors, differences in detector response will occur. This is commonly referred to as spatial non-uniformity, and is due to the variations in a number of critical performance characteristics of the microbolometer detectors. This is a natural result of the microbolometer fabrication process. The characteristics contributing to spatial non-uniformity include the infrared radiation absorption coefficient, resistance, temperature coefficient of resistance (TCR), heat capacity, and thermal conductivity of the individual detectors.

The magnitude of the response non-uniformity can be substantially larger than the magnitude of the actual response due to the incident infrared radiation. The resulting ROIC output signal is difficult to process, as it requires system interface electronics having a very high dynamic range. In order to achieve an output signal dominated by the level of incident infrared radiation, processing to correct for detector non-uniformity is required.

Methods for implementing an ROIC for microbolometer arrays have used an architecture wherein the resistance of each microbolometer is sensed by applying a uniform electric signal source, e.g., voltage or current sources, and a resistive load to the microbolometer element. The current resulting from the applied voltage is integrated over time by an amplifier to produce an output voltage level proportional to the value of the integrated current. The output voltage is then multiplexed to the signal acquisition system.

Gain and offset corrections are applied to the output signal to correct for the errors that may arise from the microbolometer property non-uniformities. This process is commonly referred to as two-point correction. In this technique two correction coefficients are applied to the sampled signal of each element. The gain correction is implemented by multiplying the output voltage by a unique gain coefficient. The offset correction is implemented by adding a unique offset coefficient to the output voltage. Both analog and digital techniques have been utilized to perform this two-point non-uniformity correction.

The current state-of-the-art in microbolometer array ROICs suffers from two principal problems. The first problem is that the larger arrays increase substrate temperature. A second problem is that a larger microbolometer introduces non-uniformities in the ROIC integrated circuit output signal thereby requiring a large instantaneous dynamic range in the sensor interface electronics that increases the cost and complexity of the system. Current advanced ROIC architectures, known in the art, incorporate part of the correction on the ROIC integrated circuit to minimize the instantaneous dynamic range requirements at the acquisition systems interface.

A technique for minimizing the effect of substrate temperature variations is to provide "cooling" of the substrate (i.e., substrate temperature stabilization) so as to maintain a substantially constant substrate temperature. One common technique employed for substrate temperature stabilization is the use of what is commonly referred to as "thermo-electric cooling", and is sometimes referred to as "an uncooled microbolometer,"—as compared to those "cooled" microbolometers employing extreme temperature control of the focal plane array and ambient environment by way of cryogenic cooling or the like. As used herein, the term "thermal electric cooler" is equivalent to the term "thermal electric stabilizer"—both of which are commonly used in the art and refer to a technique for raising and lowering the temperature of a substrate to maintain the substrate at a substantially constant temperature.

An uncooled microbolometer focal plane array is taught in U.S. Pat. No. 5,756,999, entitled, "Methods and Circuitry for Correcting Temperature-Induced Errors in Microbolometer Focal Plane Array, issued to Parrish, et. al. Therein, a bias correction method and a pre-bias correction method are taught. With regard to the bias correction method, as stated therein, "According to the bias-correction method, a unique bias amplitude is applied to each detector during the integration period to support uniformity correction. The bias-correction method can be implemented as an adjustable voltage, current, or load bias that is applied to the microbolometer detectors during the integration (measurement) period. . . . The bias-correction value is applied during the integration period of the microbolometer detector using an adjustable voltage source. . . . The bias-correction value is controlled by the output of a digital-to-analog converter (DAC). . . . The adjustable bolometer bias may be used to correct the optical gain of the signal for uniform output at a particular substrate temperature in conjunction with single-point offset correction . . . to remove residual fixed offsets."

Although the aforesaid patent sets forth improved methods for correcting temperature induced errors in microbolometer focal-plane arrays, these methods still remain complex and time consuming.

Another method for controlling bias for a microbolometer focal plane array permitting a truly "uncooled" microbolometer focal plane array is taught in copending U.S. patent application, having Ser. No. 09/414,688 now U.S. Pat. No. 6,444,983, entitled, "Microbolometer Focal Plane Array With Controlled Bias," in the name of T. McManus, et. al., and is incorporated herein by reference thereto. As taught therein, a single thermally-shorted microbolometer detector is employed for controlling the magnitude of an electric signal bias source that is applied to all microbolometers of a focal plane array on a substrate. A calibration bias source magnitude is determined and continually adjusted as a function of the reading value of the resistance of the thermally-shorted microbolometer at calibration, and readings of the thermally-shorted microbolometer after each image sample is taken. With the bias controlled in a manner as just described, temperature induced errors are minimized thereby permitting the microbolometer focal plane array to be employed without the need of any thermoelectric cooling of the substrate.

Another source of error in "non-cooled" microbolometer focal play arrays is the variation in "responsivity" of each pixel to changes in temperature. This is so since each pixel is a temperature sensitive resistor having a sensitivity that varies due to minute variances in the manufacturing process from one pixel to another. The temperature of a pixel is affected by the bias current flowing there through, since that current inherently warms the pixel due to the power dissipated. Heat is also transferred to the pixel through the focal plane array's substrate. Heat is also transferred to the pixel by infrared radiation focused on the pixel.

In order to produce a high quality image from a microbolometer focal plane array, the differences in responsivity from one pixel to another need to be taken into account, and the change in pixel resistance due to infrared radiation impinging thereon must be separated from any resistance changes due to all other sources of heat transfer.

SUMMARY OF THE INVENTION

An object of the present invention is to provide a method of processing pixel information of a microbolometer focal plane array without focal plane array substrate temperature stabilization, i.e., cooling.

An object of the present invention is to provide a technique for compensation for pixel non-uniformity of a microbolometer focal plane without focal plane array substrate temperature stabilization.

In accordance with the present invention, a microbolometer focal plane array is provided with at least one thermally-shorted microbolometer detector that is thermally shorted to the microbolometer focal plane array substrate. A characteristic relationship is empirically derived for determing a corrected resistance value $X^n$ for each detector of the microbolometer focal plane array in response to radiation from a target scene as a function of the corresponding detector resistance value $R^n$, the thermally-shorted microbolometer detector resistance value $RS(T_k)$, and the empirically derived characteristic relationship.

DETAILED DESCRIPTION OF THE INVENTION

Figure 1A:
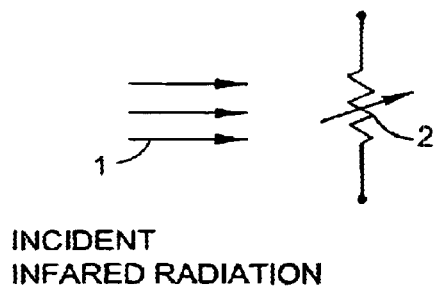
FIGS. 1A–1C are schematic diagrams of prior art bolometer circuits.
Figure 1B:
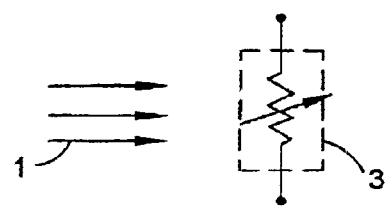
Figure 1C:
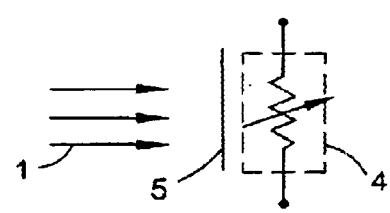

Constructions of microbolometer focal plane arrays and application circuitry are taught in the aforesaid U.S. Pat. No. 5,756,999 and is incorporated herein by reference. Individual microbolometer detectors including both thermally-isolated and thermally-shorted varieties, and associated detector circuitry are also described in detail therein. However, the following excerpt is provided as a foundation for the description of the present invention that follows:

"FIGS. 1A, 1B and 1C illustrate three possible configurations for microbolometer detectors. Incident infrared radiation 1 is projected onto each of the microbolometer detectors. The microbolometer detector 2, shown in FIG. 1A, is thermally shorted to the substrate material, herein referred to as the thermally-shorted microbolometer or heat sunk pixel. This is a common form of bolometer and is representative of most single-detector bolometers and thermistors. Microbolometers can be manufactured to provide a high thermal conductivity to the substrate, or this property can be introduced through post-processing whereby a thermally conductive material is selectively applied to these microbolometer detectors. Although this detector is thermally connected to the substrate, the resistance properties and temperature coefficient of resistance (TCR) of these detectors are equivalent to the thermally-isolated microbolometer detector 3, shown in FIG. 1B. These detectors have a high TCR (1% to 5%/degree C.) which is designated by the arrow in the resistor symbol.

The thermally-isolated microbolometer 3 is most commonly used to sense infrared radiation. Thermally-isolated microbolometer 3 is thermally isolated from its supporting substrate or surroundings to allow the absorbed incident infrared radiation to generate a temperature change in the microbolometer material. In FIG. 1B, the dashed square box around the detector designates this isolation.

The final configuration, shown in FIG. 1C, is the shielded microbolometer 4. The shielded microbolometer 4 is identical to the thermally-isolated microbolometer 3 with the exception that incident infrared radiation 1 is shielded from the microbolometer. The radiation shield is designated by a solid line 5 in FIG. 1C.

The principles of operation for the microbolometers shown in FIGS. 1A–1C are as follows. The temperature of the non-isolated microbolometer 2 is dominated by the high thermal conductivity to the substrate. Therefore incident infrared radiation and electrical power dissipated in the microbolometer have little effect on the temperature of the microbolometer. Microbolometer 2 has the same high TCR as the thermally isolated microbolometer 3 and therefore provides a high sensitivity reference to the substrate temperature.

The thermally-isolated microbolometer 3 changes temperature in response to the incident radiation level changes in the substrate temperature, and the electrical power dissipated in the detector during the measurement of the microbolometer resistance. The heating due to resistive measurement is referred to as self-heating. As fabricated, the thermally isolated microbolometer is not perfectly insulated from the substrate. Therefore the temperature of the thermally isolated microbolometer does track the substrate temperature to some extent, although the rate of temperature change due to this mechanism is much slower than those due to incident radiation or self-heating.

The shielded isolated microbolometer 4 does not change temperature in response to the incident radiation level, but does change temperature as a result of self-heating and temperature changes in the substrate."

In the present invention, the thermally-shorted microbolometer 2 depicted in FIG. 1 may be thought of as a heat sunk pixel. This heat-sunk pixel may be constructed by way of thermally shorting a thermally-isolated microbolometer by way of a thermally conductive paste, or other techniques. However, it is of paramount importance in accordance with the present invention that the heat-sunk pixel is primarily responsive to the temperature of the substrate upon which the thermally-isolated microbolometers are constructed.

Figure 2:
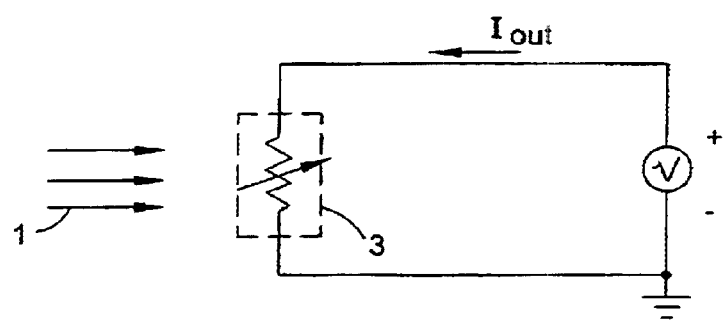
FIG. 2 is a schematic diagram illustrating an applied voltage bias method for measuring microbolometer resistance.
Figure 3:
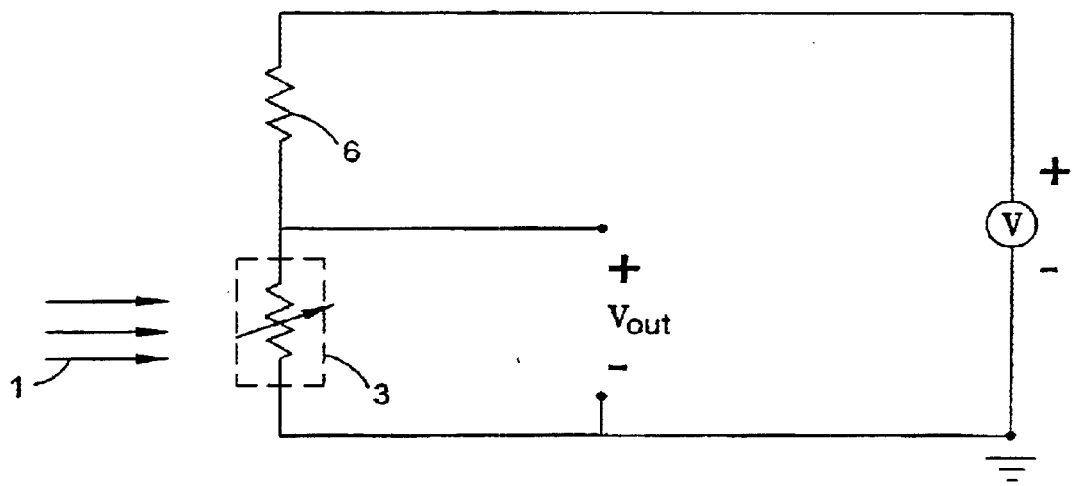
FIG. 3 is a schematic diagram illustrating an applied current bias method for measuring microbolometer resistance.
Figure 4:
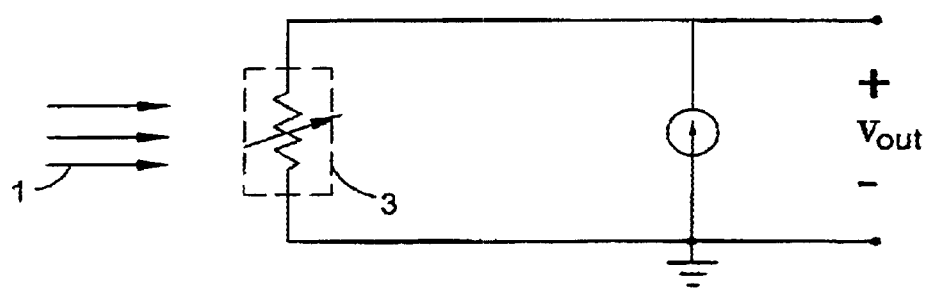
FIG. 4 is a schematic diagram illustrating an applied voltage bias method for measuring microbolometer resistance.

FIGS. 2–4 illustrate three commonly used techniques for measuring the resistance of a microbolometer detector. FIG. 2 shows an applied electric bias voltage method of sensing the detector resistance. An applied voltage bias is used to generate a current in the circuit designated $I_{out}$. By measuring the current $I_{out}$, the resistance of the microbolometer detector can be determined. The relationship between the applied voltage and measured current is defined by Ohms Law.

$$I_{out} = V_{applied}/R_{bolometer} \tag{1}$$

Where $I_{out}$ is the measured current, $V_{applied}$ is the applied voltage bias, and $R_{bolometer}$ is the microbolometer detector resistance.

A second method for measuring the microbolometer resistance is shown in FIG. 3. Here a constant electric current bias is applied to the microbolometer detector 3, and the voltage that develops across the microbolometer as a result is measured. Again, Ohms Law defines the relationship between the applied current and the measured voltage.

$$V_{out} = I_{applied} * R_{bolometer} \tag{2}$$

A third method for measuring the microbolometer resistance is shown in FIG. 4. This circuit includes a resistive load 6. A voltage is applied across the series combination of the microbolometer 3 and the load 6. The microbolometer resistance can be determined by measuring the voltage across the microbolometer. The following expression describes the microbolometer resistance as a function of applied voltage bias, load resistance, and the measured voltage across the microbolometer.

$$R_{bolometer} = R_{load}/[V_{applied}/V_{out} - 1] \tag{3}$$

where $R_{load}$ is the value of load resistor 6.

These circuit implementations may be used to measure infrared radiation incident on the microbolometer by sensing the change in microbolometer temperature due to the optical (infrared) energy absorbed by the detector. The temperature rise in the microbolometer detector due to self-heating generally is significantly larger than the temperature rise resulting from the incident infrared radiation. The relatively small contribution of incident radiation to the change in microbolometer resistance is difficult to detect. For this reason, it is desirable to incorporate more complex circuits using in-circuit reference schemes in order to minimize the contribution of self-heating to the output signal. In the case of the resistive load circuit approach (FIG. 4), the load resistor 6 may be designed to have a low temperature coefficient of resistance, or it may be thermally shorted to the substrate, or shielded from incident infrared radiation.

Commonly, the outputs as described by the aforementioned equations are converted to a digital representation or number by way an analog-to-digital output converter (A/D converter). The A/D output converter generally has a limited range from zero to some maximum value.

Circuits and methods similar to those just described have been commonly employed in conjunction with a thermo-electric cooler coupled to the FPA substrate so as to maintain the substrate at a constant temperature and thereby avoid large swings in the output measurements. This is so, since only the detected temperature change induced by infrared radiation is desired.

Figure 5:
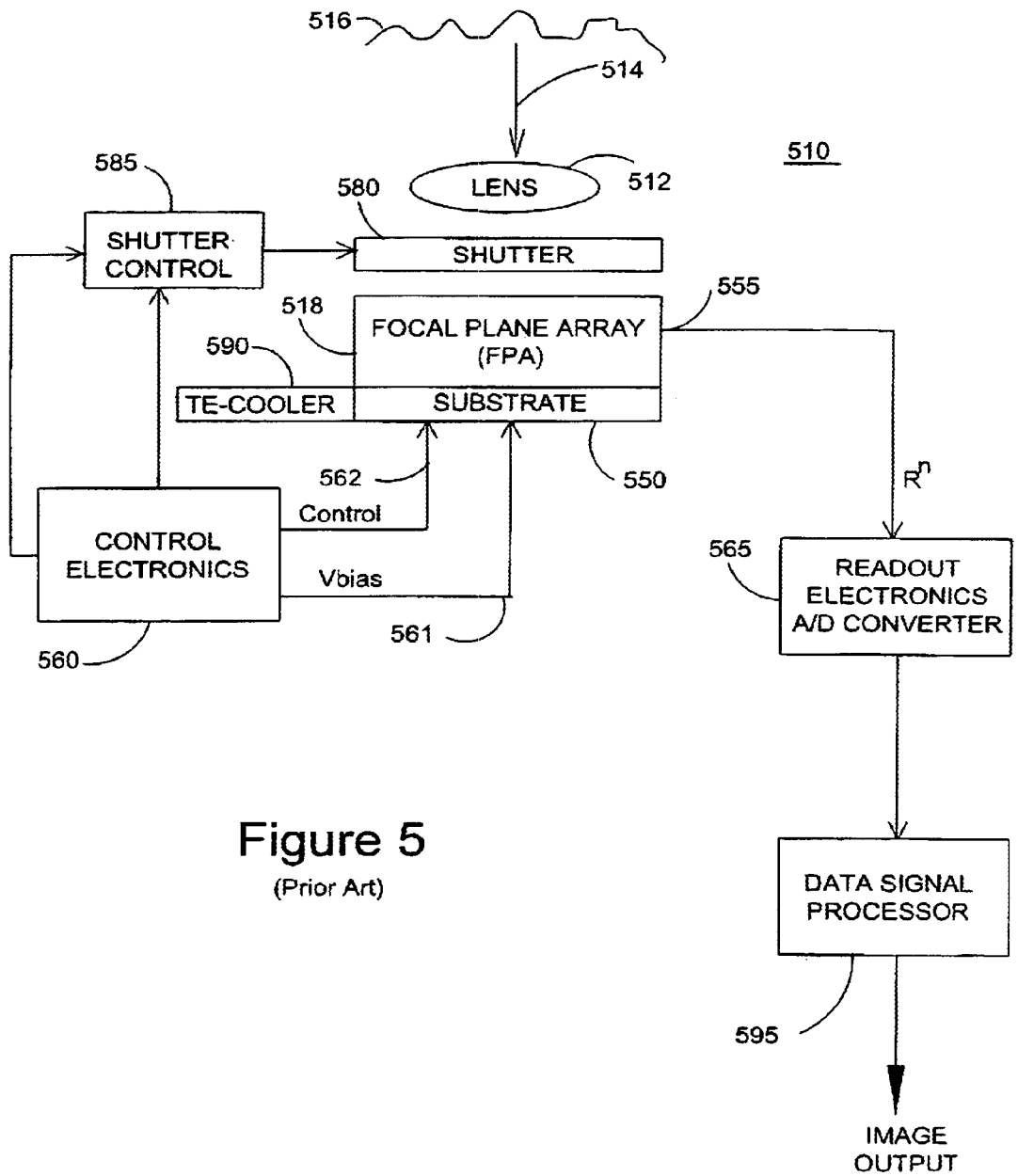
FIG. 5 is a schematic diagram of a microbolometer camera system of the prior art.

FIG. 5 shows a schematic view of a miniaturized uncooled camera 510 similar to that illustrated in the aforementioned U.S. Pat. No. 6,023,061. A compound lens 512 (here shown as a single lens for ease of illustration) collects infrared energy 514 from a scene 516 and images the scene onto a two-dimensional uncooled focal plane array (FPA) 518. The FPA 518 is comprised of an M×N array of thermally-isolated microbolometer detectors or pixels on a semiconductor substrate 550. Substrate 550 commonly may include integrated circuit architecture within the substrate for providing sensor bias and detector output multiplexing functions as desired. Each detector or pixel may be manufactured as a microbridge such as described in the aforementioned U.S. Pat. No. 5,286,976. These microbolometers are manufactured directly onto the substrate by known methods.

Control electronics 560 is coupled to the FPA 518 through one or more signal lines for applying the desired bias through a bias signal line 561 to each detector. Further, control electronics 560 further includes multiplexing functions through a control signal line 562 so that at array output 555 is an output signal representative of the resistance of a single thermally-isolated microbolometer detector $R^n$ where "n" represents one of the M×N array of detectors. In turn, output 555 is coupled to read-out electronics 565 for providing a digital signal representative of each detector resistance, and permits further digital signal processing, as desired, by a data signal processor 595.

As is well known in the art, offset and gain information associated with each of the detectors is obtained by a calibration technique in which the FPA is subjected to a scene of known radiation emissivity. This calibration technique is depicted in the drawing by way of controlled shutter 580 and shutter control 585 in cooperation with control electronics 560 via control signal line 581. Commonly, shutter 580 has a known radiation emissivity and is presented to the FPA 518 such that all of sensors view a uniform temperature scene. As such, when viewing a uniform temperature scene, a frame of data is substantially uniform, and thereby permits offset information associated with each of detectors to be derived by the data signal processor 595. The frequency of the employment of this calibration technique may be executed as desired.

As is also noted in FIG. 5, a TE cooler 590 is coupled to substrate 550 so as to maintain the substrate at substantially a constant temperate so as to minimize errors attributed to variation in gain and offset, as well as detector sensitivity, due to the heat transfer from the substrate to the thermally-isolated microbolometer detectors.

In operation, the camera 510 takes one frame of data corresponding to an array of data values, one from each detector, for each integration time of the FPA 518. The frames of data are common data constructs known to those skilled in the art in both cooled and uncooled arrays. As indicated before, control electronics 560 is intended to negotiate and control the flow of data between the FPA 518 and the read out electronics 565. In turn, the output of readout electronics 565 is presented to data signal processor 595 for providing offset and gain correction to the detector information as desired, as well as image data conversion for subsequent display and/or recording. Of course, associated with data signal processor 595 is data storage (not shown) for storing scene information as desired.

As previously mentioned, in order to produce a high quality image from a microbolometer focal plane array, the differences in responsivity from one pixel to another need to be taken into account, and the change in pixel resistance due to infrared radiation impinging thereon must be separated from any changes due to all other sources of heat transfer. In the prior art, this is commonly accomplished by (i) forcing the FPA substrate to specific temperatures or set points through use of a thermoelectric stabilizer (illustrated in FIG. 5); (ii) exposing the FPA to a uniform temperature source (the shutter) to obtain a baseline level for each pixel; and (iii) then subtracting that baseline from subsequent resistance reading or measurements.

In the preferred embodiment of the invention, the baseline level of resistance for each pixel may be estimated by use of a heat sunk pixel, like that already described. This is so, since the heat-sunk pixel provides an indication or measurement of the substrate temperature. Accordingly, the heat sunk resistance value may be utilized to estimate the base line resistance of each of the imaging pixels, namely the thermally isolated detectors. This estimate may be derived from either (i) application of a mathematical relationship between the resistance of each imaging pixel and that of the heat sunk pixel, or (ii) by interpolating between a set of offset values which are stored in a series of look-up tables.

A mathematical relationship describing the characteristic relationship of the baseline resistance of each pixel relative to the heat sunk pixel—i.e., the indication of substrate temperature, may be described as follows:

$$R^n = m^n * RS(T) + b^n \quad (1)$$

where n represents a unique one of the M×N array of detectors, $R^n$ is the resistance value of the sensed target temperature of the $n^{th}$ detector, RS(T) is the resistance of the heat-sunk pixel exhibiting a resistance value substantially indicative of sensed substrate temperature, T, $m^n$ relates the difference in responsivity between the heat sunk pixel and the $n^{th}$ pixel, $b^n$ encompasses a constant difference in resistance between the heat sunk pixel and the $n^{th}$ pixel, and $R^n$ and RS(T) are determined at substantially the same instant of time.

This unique characteristic information, namely $b^n$ and $m^n$, associated with each pixel may be empirically derived. A method for empirically deriving the values of $b^n$ and $m^n$ is accomplished by first exposing the FPA to a uniform temperature source (the shutter) while the substrate temperature is held at a first one, $T_k$ of several temperatures. A measurement $R^n@T_k$ for each pixel is stored. The process is continued for a plurality of substrate temperatures covering a temperature range corresponding to the operating ambient temperature limits of the FPA. A regression model may be then applied to the collected data to derive the corresponding values of $b^n$ and $m^n$ associated with $n^{th}$ pixel of the M×N array of pixels.

After $b^n$ and $m^n$ have been determined, the above relationship may be utilized to correct each pixel resistance value subjected to a scene as follows:

$$X^n = R^n - [m^n * RS(T) + b^n] \quad (2)$$

where $R^n$ is the resistance measurement of the $n^{th}$ pixel exposed to a target scene, and where $X^n$ is the corrected resistance value of the $n^{th}$ pixel.

Figure 6:
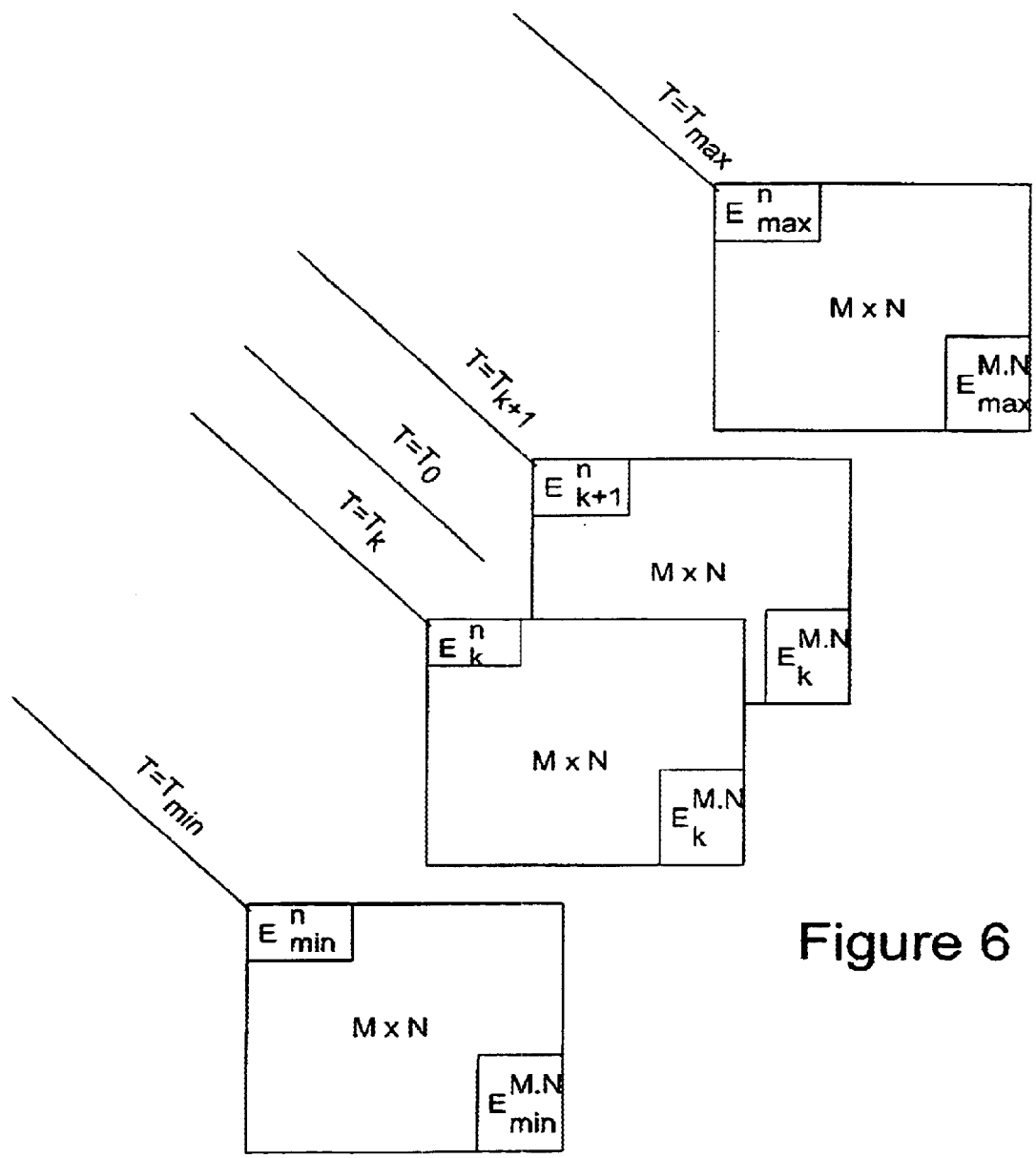
FIG. 6 is a graphical depiction of look-up tables as may be employed in practice of the present invention.

Alternatively, with the use of equation (1), the corrected resistance value may be interpolated from a plurality of look-up tables graphically depicted in FIG. 6. Each table is determined in manner similar to that already described above for determining the unique characteristic information described above. More specifically, offset values of $E^n$ are stored in a table corresponding to a specific heat sunk pixel temperature T, where the value of $E^n$ is described as follows:

$$E^n(T_k) = R^n(T_k) - RS(T_K)$$

The ambient temperature is changed so as to arrive at another heat sunk pixel temperature. Again, the values of $E^n$ are stored in a table corresponding to a different heat sunk pixel temperature $T_{k+i}$, as particularly illustrated in FIG. 6.

To derive the corrected resistance value $X^n$ of the $n^{th}$ pixel, values of $R^n$ at $T_0$ is determined, namely $R^n(T_0)$. Values of $E^n$ from the closest look-up tables corresponding to the heat sunk pixel temperatures above and below the actual heat sunk pixel temperature $T_0$ are used to determine the corrected resistance value $X^n$ as is mathematically expressed below:

$$X^n(T_0) = R^n(T_0) - \left\{ E^n @ RS(T_k) + [RS(T_0) - RS(T_k)] * \frac{[E^n @ RS(T_{k+1}) - E^n @ RS(T_k)]}{[RS(T_{k+1}) - RS(T_k)]} \right\} \quad (3)$$

where $T_0$ is between $T_{k+1}$ and $T_k$, and $E^n @ RS(T_{k+1})$, $E^n @ RS(T_k)$ are the offset values associated with corresponding tables $T_{k+1}$ and $T_k$ and $R^n(T_0)$ and $RS(T_0)$ are determined at substantially the same instant of time.

Application of the principles of present invention, as described above, are particularly illustrated in FIG. 7 which is a simplified schematic diagram of a microbolometer imaging apparatus with pixel compensation in accordance with the present invention. Like components in FIG. 7 as those in FIG. 5 have retained the same numeral designation. In the preferred embodiment of the invention, the TE cooler 590 may not be required and is therefore not shown.

Figure 7:
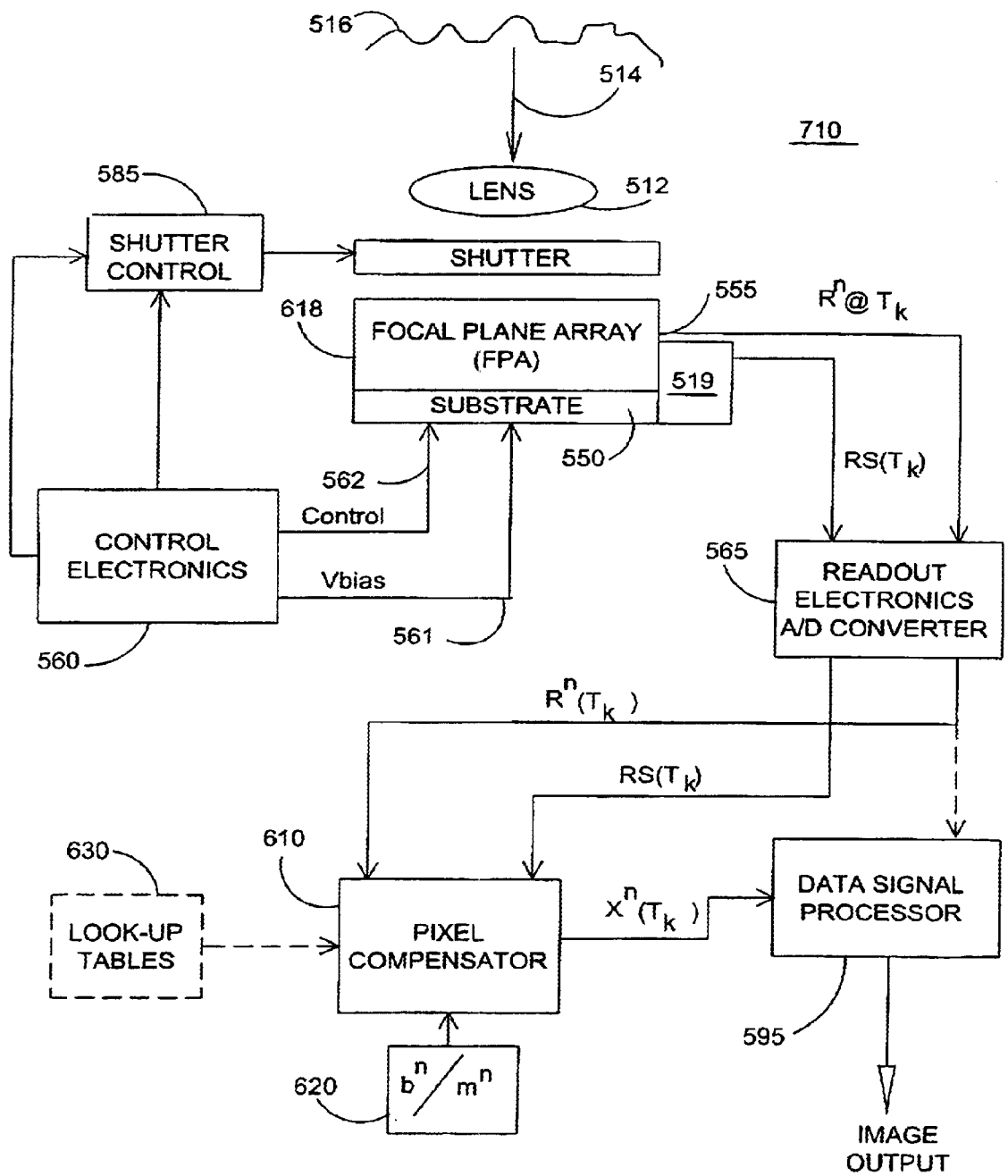
FIG. 7 is a schematic diagram of a pixel compensator for a microbolometer camera system in accordance with the present invention.

As illustrated in FIG. 7, a pixel compensator processor 610 receives the digital information representative of the resistance of each of the detectors for deriving an output value $X^n$ representative of the compensated raw resistance value $R^n$ in a manner as will subsequently be described.

As illustrated in FIG. 7, FPA 618, similar to FPA 518 of FIG. 5, includes a heat-sunk pixel designated by numeral 519. Readout electronics 565 is illustrated as being capable of processing either the heat sunk pixel 519 or the remaining FPA pixels designated simply as $R^n$. A pixel compensator processor 610 receives the digital information representative of the resistance of each of the detectors from the output of readout electronics 565. Pixel compensator processor 610 serves to derive an output value $X^n$ representative of the compensated or corrected raw resistance value $R^n$ in a manner as previously described. Coupled to pixel compensator processor 610 is a data storage device 620 containing unique characteristic information $Q^n$, more specifically the values of $b^n$ and $m^n$ associated with each pixel as previously described. In an alternate embodiment, a storage device 630 may provide pixel compensator processor 610 the aforedescribed look-up tables. It should be noted that although pixel compensator processor 610 is shown separate from data signal processor 595, as well as storage devices 620 and 630, they may be embedded therewith.

In operation, storage device 620, or alternatively 630, is loaded with the unique characteristic information $Q^n$ associated with each $n^{th}$ pixel, namely the values $b^n$ and $m^n$, or alternatively the look-up tables, respectively. For each data frame of the observed image, the values of $R^n$ and $RS(T_0)$ are read from FPA array 618. In turn, the corrected values $X^n$ corresponding to each pixel are derived in a manner as already described and expressed by equations (1) and (2) above. In turn, the values of $X^n$ may be processed by data signal processor 595 in the usual manner so as to derive an image for subsequent display or analysis (not shown).

It should be noted that the digital representations of the raw resistance values $R^n$ of the FPA may also be provided to data signal processor 595 for providing other functions, including, but not limited to, offset and gain corrections.

Figure 8:
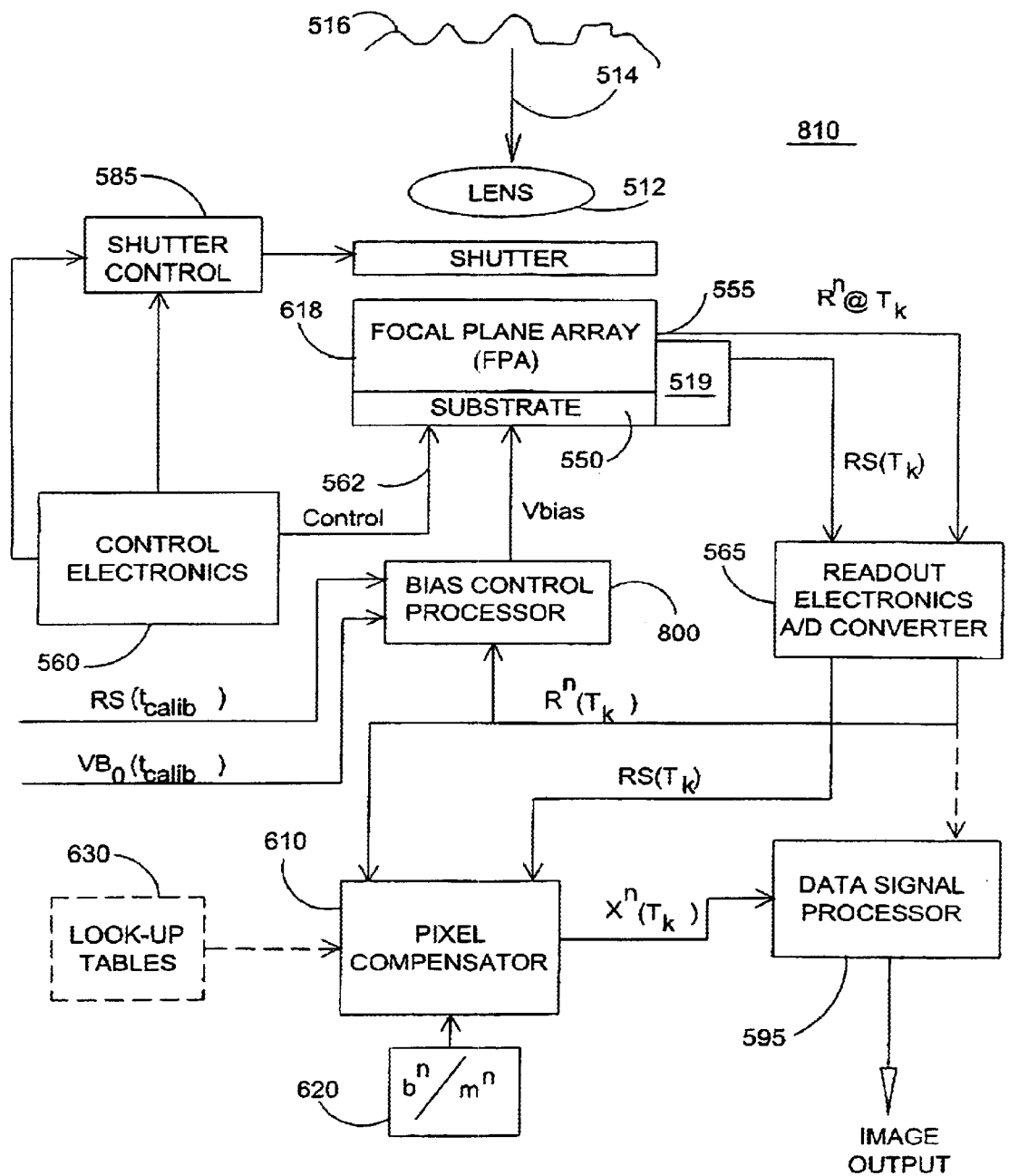
FIG. 8 is another embodiment of the invention including a bias control processor.

FIG. 8 is a simplified schematic diagram of microbolometer imaging apparatus of FIG. 7 further including a controlled bias as described in the aforesaid patent application. As taught in the aforesaid patent application, bias control processor 800 receives, as inputs, signals representative of an initial value of bias voltage $VB_0$ at the calibration time $t_{calib}$, and the value of the resistance value of the heat sunk pixel at the calibration time, $RS(t_{calib})$, and the current resistance value of the heat sunk pixel $RS(t_{current})$. The initial value of bias voltage $VB_0$ is set in a manner such that the average of the resistance of all of the thermally-isolated detectors corresponds to a midpoint of the A-to-D converter normally associated with the readout electronics 565. In operation, the bias voltage is adjusted in relation to the difference between the current resistance value of the heat-sunk pixel and the resistance value at calibration. Adjusting the bias voltage as just described is intended to minimize the effect of variations in offset and gain caused by variation in FPA substrate temperature. Thus, bias control processor 800 serves as a feedback information processor for controlling the applied voltage bias, as a function of selected historical information as derived form the behavior of both the thermally-isolated microbolometers and the heat sunk pixel, i.e. the thermally-shorted microbolometer detector.

It should be noted that, as used herein, a "microbolometer" refers to any bolometer type of construction in which a sensor exhibits a resistance change as a function of the observed radiation impinging thereon. Further, it should be recognized that functions provided by way of control electronics 560, shutter control 585, readout electronics 565, data signal processor 595, and pixel compensator 610 may be provided by a single signal control and data processor, microprocessor, computer, or the like. Also, more or less of the aforementioned control function may be integrated as part of substrate 550. It should be recognized that in the alternative, all of the electronics may be remote from the focal plane array by way of cables, radio signals, or the like. It should also be recognized by those skilled in the art, that the aforementioned control may be implemented by way of software or firmware in order to achieve the intended functions as described here. These and other arrangements are, of course, intended to be within the true spirit and scope of the present invention.

While the present invention has been particularly shown and described with reference to the accompanying figures, it will be understood, however, that other modifications thereto are of course possible, all of which are intended to be within the true spirit and scope of the present invention. Various changes in form and detail may be made therein without departing from the true spirit and scope of the invention as defined by the appended claims.

I claim:

1. An uncooled infrared camera comprising:
a microbolometer focal plane array associated with a substrate responsive to a target scene through a selected lens, wherein said microbolometer focal plane array includes,
  a plurality, N, of substantially substrate-isolated microbolometer detectors, each exhibiting a resistance value, $R^n$, in response to the radiation temperature radiated from said sensed target scene, where n represents a unique one of said N detectors, and
  at least one temperature sensor for providing an output signal having a value, RS(T), substantially indicative of sensed substrate temperature, T;
a controllable shutter open in one state permitting the microbolometer focal plane array to be responsive to a scene, and closed in a second state subjecting the microbolometer focal plane array to a uniform temperature scene;
a readout circuit for a outputting a corresponding measurement value indicative of the resistance value associated with each of the substrate-isolated detectors;
means for storing unique characteristic information, $q^n$, associated with each nth one of said N substrate-isolated microbolometer detectors, where said characteristic information $q^n$ provides information for correcting the resistance value $R^n$ of the nth one of said substrate-isolated microbolometer detectors as a function of said sensed substrate temperature, T; and
data processor means for determining a corrected target temperature resistance value $X^n$ for each of said N detectors, where $X^n$ is a function of said resistance value, $R^n$, said characteristic information, $q^n$, and said value RS(T) indicative of said substrate temperature.

2. The camera of claim 1 wherein:
said unique characteristic information, $q^n$, is in the form of at least a data pair describing at least a first coefficient $m^n$ and a constant $b^n$ associated with the nth one of said plurality of detectors, and
said data processor means includes means for determining said corrected target temperature resistance value $X^n$ substantially in accordance with the mathematical expression:

$$X^n(T)=R^n(T)-[m^n*RS(T)+b^n]$$

where n corresponds to said nth detector, and $R^n$ (T) and RS(T) are said resistance value of said nth detector and said substrate temperature T indicated by RS(T), respectively.

3. The camera of claim 1 wherein:
said unique characteristic information, $q^n$, is in the form of a plurality of look-up data tables where each table is a set of N cells, and where each cell corresponds to a selected $n^{th}$ one of said N detectors, and where each cell contains offset error data $E^n(T_k)$ associated with said nth detector at temperature $T_k$ indicated by said temperature detector value $RS(T_k)$; and
said data processor means includes means for determining said corrected target temperature resistance value $X^n(T)$, for each of said N detectors, substantially in accordance with the mathematical expression:

$$X^n(T) = R^n(T) - \left\{E^n@RS(T) + [RS(T) - RS(T_k)] * \frac{[E^n@RS(T_{k+1}) - E^n@RS(T_k)]}{[RS(T_{k+1}) - RS(T_k)]}\right\}$$

where T is between $T_{k+1}$ and $T_k$, and $E^n@RS(T_{k+1})$, $E^n@RS(T_k)$ are the offset values associated with corresponding tables $T_{k+1}$ and $T_k$.

4. The camera of claim 1:
wherein each of said N detectors and is electrically connected to an electrical bias source, and
said microbolometer imaging apparatus further includes a bias control processor for providing said electrical bias source in relation to said temperature detector having value RS(T).

5. The camera of claim 1 wherein said characteristic information consists of at least a pair of constants b and m for determining said corrected target temperature resistance $X^n$ substantially in accordance with the following mathematical expression:

$$X^n=R^n-[m^n*RS(T)+b^n]$$

where n corresponds to said nth detector.

6. The camera of claim 5 wherein said value $m^n$ and $b^n$ are empirically determined from raw resistance values $R^n$ of said N detectors and said temperature detector value, RS(T), as said focal plane array is subjected to a uniform scene temperature at differing ones of said substrate temperature, I.

7. A method for correcting the indicated resistance value $R^n$ of each substrate-isolated microbolometer of a focal plane array including a plurality, N, of substrate-isolated microbolometer detectors on a substrate, the method comprising the steps of:
empirically deriving a characteristic relationship between the resistance of each of said microbolometer detectors, $R^n$, and the temperature of said substrate having a value numerically indicated by RS(T), where T is the substrate temperature;
determining a corrected resistance value for each detector of the microbolometer focal plane array in response to radiation from a target scene as a function of the corresponding detector resistance value $R^n$, the value RS(T); and said empirically derived characteristic relationship.

8. The method of claim 7 wherein said characteristic relationship is ma thematically describes by:

$$X^n=R^n-[m^n*RS(T)+b^n].$$

9. The method of claim 8 wherein said value $m^n$ and $b^n$ are empirically determined from raw resistance values of said N detectors and the temperature of the substrate indicated by RS(T) as said focal plane array is subjected to a uniform scene temperature at differing ones of said substrate temperature.

10. A method for providing correction to for an uncooled infrared camera employing a microbolometer focal plane array of substrate isolated microbolometers where the array includes a plurality, N, of substrate-isolated microbolometer detectors on a substrate, and where associated with each of the detectors is a resistance value $R^n$, the method comprising the steps of:
  empirically deriving a characteristic relationship between the resistance of each of said microbolometer detectors, $R^n$, and the sensed substrate temperature, T;
  determining a corrected resistance value for each detector of the microbolometer focal plane array in response to radiation from a target scene as a function of the corresponding detector resistance value $R^n$, said sensed substrate temperature; and said empirically derived characteristic relationship.

11. The camera of claim 1 wherein said temperature sensor is a at least one thermally-shorted microbolometer detector thermally shorted to said substrate, and exhibiting a resistance value, RS(T), substantially indicative of sensed substrate temperature, T.

12. The camera of claim 1 wherein said temperature sensor is a temperature sensor exhibiting a resistance value, RS(T), substantially indicative of sensed substrate temperature, T.

13. The method of claim 7 further including a temperature sensor in the form of a at least one thermally-shorted microbolometer detector thermally shorted to said substrate, and exhibiting a resistance value, RS(T), substantially indicative of sensed substrate temperature, T.

14. The method of claim 13 wherein said temperature sensor is a temperature sensor exhibiting a resistance value, RS(T), as a function of sensed substrate temperature, T.

15. A microbolometer imaging apparatus responsive to a target scene comprising:
  a microbolometer focal plane array associated with a substrate, and which said microbolometer focal plane array includes,
    a plurality, N, of substantially substrate-isolated microbolometer detectors, each exhibiting a unique resistance value, $R^n$, in response to the radiation temperature radiated from said sensed target scene, where n represents a unique one of said N detectors; and
  at least one temperature sensor having an output characteristic related to the substrate temperature, T;
  a data processor means for determining a corrected target temperature resistance value $X^n$ for each of said N detectors, where $X^n$ is derived from a function of said resistance value, $R^n$, and a function of said sensed substrate temperature, T.

16. The apparatus of claim 15 where the corrected target temperature resistance value $X^n$ is charcterizied by at least a pair of constants b and m for determining said corrected target temperature resistance $X^n$ substantially in accordance with the following mathematical expression.

$$X^n = R^n - [m^n * RS(T) + b^n]$$

where n corresponds to said nib detector, RS(T) represents said sensed substrate temperature.

17. The apparatus of claim 16 above wherein said constants $m^n$ and $b^n$ are empirically determined from raw resistance values of said N detectors and said sensed substrate temperature as said focal plane array is subjected to differing uniform scene substrate temperatures.

18. The apparatus of claim 15 above further including:
  a plurality of look-up tables having unique correction values $E^n(T_k)$ associated with each of said N detectors corresponding to a selected substrate temperature $T_k$, and where each of said correction values is empirically determined from raw resistance values $R^n$ of said N detectors and said sensed substrate temperature in response to said focal plane array being subjected to a uniform scene temperature at differing ones of said substrate temperature, T, where each of said tables corresponds to a selected substrate temperature, $T_k$; and
  where each of said tables provides said correction value $E^n(T_k)$ for each of said N detectors for selected substrate temperatures, $T_k$, such that said corrected target temperature resistance values $X^n(T)$ are substantially derived from a function of,
    (i) said resistance value $R^n(T)$,
    (ii) an estimated detector correction value $E^n(T)$, derived from selected ones of said plurality of look-up tables, and
    (iii) said sensed substrate temperature T.

19. A microbolometer correction method for correcting indicated raw resistance value $R^n$ of each $n^{th}$ one of a plurality of N substrate-isolated microbolometer detectors on a substrate of a focal plane array, the method comprising the steps of:
  empirically determining separately for each $n_{th}$ one of said N substrate-isolated microbolometer detectors unique characteristic information $q^n$ for deriving a corrected resistance value $X^n(T)$ as a function of sensed substrate temperature T;
  determining resistance values $R^n(T)$ for each one of said N substrate-isolated microbolometer detectors in response to radiation from a target scene; and
  correcting each of said subsequent resistance values $R^n(T)$ as a function of sensed substrate temperature, and said characteristic information $q^n$.

20. The method of claim 19 further comprising the step of establishing a look up table descriptive of said characteristic information, where each of said tables corresponds to a selected substrate temperature $T_k$.

21. The method of claim 19:
  wherein each of said N detectors is electrically connected to an electrical bias source, and
  said method includes the step of adjusting said electrical bias source in response to said sensed substrate temperature.

22. The method of claim 19 wherein said characteristic information consists of at least a pair of constants b and m for determining said corrected target temperature resistance $X^n$ substantially in accordance with the following mathematical expression:

$$X^n = R^n - [m^n * RS(T) + b^n]$$

where n corresponds to said nth detector, and value RS(T) represents said sensed substrate temperature.

23. The method of claim 22 wherein said value $m^n$ and $b^n$ are empirically determined from raw resistance values of said N detectors and said sensed substrate temperature as said focal plane array is subjected to a uniform scene temperature at differing ones of said substrate temperature, and where n corresponds to said nth detector.

24. A microbolometer imaging apparatus responsive to a target scene comprising:
  a microbolometer focal plane array associated with a substrate, and which said microbolometer focal plane array includes,
    a plurality, N, of substantially substrate-isolated microbolometer detectors, each exhibiting a unique resistance value, R$^n$, in response to the radiation temperature radiated from said sensed target scene, where n represents a unique one of said N detectors; and at least one temperature sensor having an output characteristic related to the substrate temperature, T;

a data processor means for determining a corrected target temperature resistance value X$^n$(T) for each of said N detectors, where X$^n$(T) is a function of
  (i) said resistance value, R$^n$,
  (ii) a plurality of look up tables having unique correction values E$^n$(T$_k$), where each table is associated with selected ones of substrate temperatures T$_k$, and
  (iii) said sensed substrate temperature T.

25. The apparatus of claim 24 wherein:

said plurality of look-up tables are empirically determined from raw resistance values R$^n$ of said N detectors and said sensed temperature of said substrate in response to said focal plane array being subjected to a uniform scene temperature at differing ones of said substrate temperature, T, where each of said tables corresponds to a selected substrate temperature, T$_k$; and each of said tables provides a correction value E$^n$(T$_k$) for each of said N detectors for selected substrate temperatures, T$_k$, such that said corrected target temperature resistance values X$^n$(T) are substantially derived from a function of,
  (i) said resistance value R$^n$(T),
  (ii) an estimated detector correction value E$^n$(T), derived from selected ones of said plurality of look-up tables, and
  (iii) said sensed substrate temperature.

26. The method of claim 25 further comprising the step of subjecting said focal plane array temporarily to a uniform temperature scene by way of opening and closing a shutter.

27. The method of claim 26 further comprising the step of applying a 2-point correction scheme.

28. A microbolometer imaging apparatus responsive to a target scene comprising:

a microbolometer focal plane array associated with a substrate, and which said microbolometer focal plane array includes,
  a plurality, N, of substantially substrate-isolated microbolometer detectors, each exhibiting a resistance value, R$^n$, in response to the radiation temperature radiated from said sensed target scene, where n represents a unique one of said N detectors; and at least one temperature sensor having an output characteristic related to the substrate temperature, T;

means for storing unique characteristic information, q$^n$, associated with each nth one of said N substrate-isolated microbolometer detectors, where said characteristic information q$^n$ provides information for correcting the resistance value R$^n$ of the nth one of said substrate-isolated microbolometer detectors as a function of said sensed substrate temperature, T; and data processor means for determining a corrected target temperature resistance value X$^n$ for each of said N detectors, where X$^n$ is a function of said resistance value, R$^n$, said characteristic information, q$^n$, and said sensed substrater temperature, T.

29. The apparatus of claim 28 wherein:

said unique characteristic information, q$^n$, is in the form of at least a data pair describing at least a first coefficient m$^n$ and a constant b$^n$ associated with the nth one of said plurality of detectors, and said data processor means includes means for determining said corrected target temperature resistance value X$^n$ substantially in accordance with the mathematical expression:

$$X^n(T) = R^n(T) - [m^n * RS(T) + b^n]$$

where n corresponds to said nth detector, and R$^n$(T) and RS(T) are said resistance value of said nth detector and a value indicative of said sensed substrtae temperature, respectively, at substantially said substrate temperature, T.

30. The apparatus of claim 28 wherein:

said unique characteristic information, q$^n$, is in the form of a plurality of look-up data tables where each table is a set of N cells, and where each cell corresponds to a selected n$^{th}$ one of said N detectors, and where each cell contains offset error data E$^n$(T$_k$) associated with said nth detector at temperature T$_k$ indicated by said temperature sensor having a value RS(T$_k$); and said data processor means includes means for determining said corrected target temperature resistance value X$^n$(T), for each of said N detectors, substantially in accordance with the mathematical expression:

$$X^n(T) = R^n(T) - \left\{ E^n @ RS(T) + [RS(T) - RS(T_k)] * \frac{[E^n @ RS(T_{k+1}) - E^n @ RS(T_k)]}{[RS(T_{k+1}) - RS(T_k)]} \right\}$$

where T is between T$_{k+1}$ and T$_k$, and E$^n$@RS(T$_{k+1}$), E$^n$@RS(T$_k$) are the offset values associated with corresponding tables T$_{k+1}$ and T$_k$.

* * * * *